US007274681B2

(12) United States Patent
Oki

(10) Patent No.: US 7,274,681 B2
(45) Date of Patent: Sep. 25, 2007

(54) METHOD OF MULTIPLEXING INFORMATION IN MOBILE COMMUNICATIONS, METHOD AND APPARATUS FOR DECODING TRANSPORT FORMAT COMBINATION INDICATOR, AND MOBILE STATION APPARATUS, BASE STATION APPARATUS AND MOBILE COMMUNICATION SYSTEM

(75) Inventor: Noboru Oki, Saitama (JP)

(73) Assignee: Sony Corporation, Tokyo (JP)

( * ) Notice: Subject to any disclaimer, the term of this patent is extended or adjusted under 35 U.S.C. 154(b) by 971 days.

(21) Appl. No.: 10/359,429

(22) Filed: Feb. 6, 2003

(65) Prior Publication Data

US 2003/0169709 A1 Sep. 11, 2003

(30) Foreign Application Priority Data

Feb. 8, 2002 (JP) ............................. 2002-031725

(51) Int. Cl.
*H04J 3/00* (2006.01)

(52) U.S. Cl. ................... 370/345; 370/342; 370/335; 370/329; 370/349; 370/280; 455/450; 455/522; 375/148; 375/341; 375/141

(58) Field of Classification Search ................ 370/345, 370/342, 335, 349, 329, 280; 375/147, 148, 375/341; 455/442, 450, 522
See application file for complete search history.

(56) References Cited

U.S. PATENT DOCUMENTS 6,341,125 B1 *  1/2002 Hong et al. ................. 370/335

| 6,483,828 | B1 * | 11/2002 | Balachandran et al. ..... 370/342 |
| 6,747,963 | B1 * | 6/2004 | Park et al. ................... 370/335 |
| 6,816,507 | B1 * | 11/2004 | Jarbot et al. ................. 370/465 |
| 6,882,636 | B1 * | 4/2005 | Kim et al. ................... 370/342 |
| 6,907,248 | B2 * | 6/2005 | Lee et al. .................... 455/450 |
| 6,934,321 | B2 * | 8/2005 | Sato ........................... 375/150 |
| 6,970,438 | B2 * | 11/2005 | Mate et al. ................. 370/329 |

(Continued)

FOREIGN PATENT DOCUMENTS

EP    1 102 440    5/2001
EP    1 104 130    5/2001

OTHER PUBLICATIONS

"3rd Generation Partnership Project; Technical Specification Group Radio Access Network; Multiplexing and Channel Coding (FDD)" 3GPP TS 25.212.V3.4.0, XX, XX, 1999, pp. 47-52, XP002938096.

*Primary Examiner*—Marceau Milord
(74) *Attorney, Agent, or Firm*—Frommer Lawrence & Haug LLP; William S. Frommer; Thomas F. Presson

(57) ABSTRACT

Control information, which is transmitted through a circuit different from the one used for the transmission of a plurality of pieces of information to be multiplexed, is analyzed. When the analysis results in a determined intra-TTI data length of information having longer Transmission Time Interval, it is determined whether a range of values that TFCI may take is limited or not. If the determination provides a positive result, the intra-TTI data length of information having a longest Transmission Time Interval which has been determined by the latest TFCI decoding is used as a base for limiting TFCI candidates to be decoded next, so as to decode the TFCI.

15 Claims, 14 Drawing Sheets

U.S. PATENT DOCUMENTS 7,027,828 B2 * 4/2006 Kim et al. .................. 455/522
7,054,381 B2 * 5/2006 Lim et al. .................. 375/295
7,085,254 B1 * 8/2006 Yun et al. .................. 370/342
7,088,688 B2 * 8/2006 Kim et al. .................. 370/280

* cited by examiner

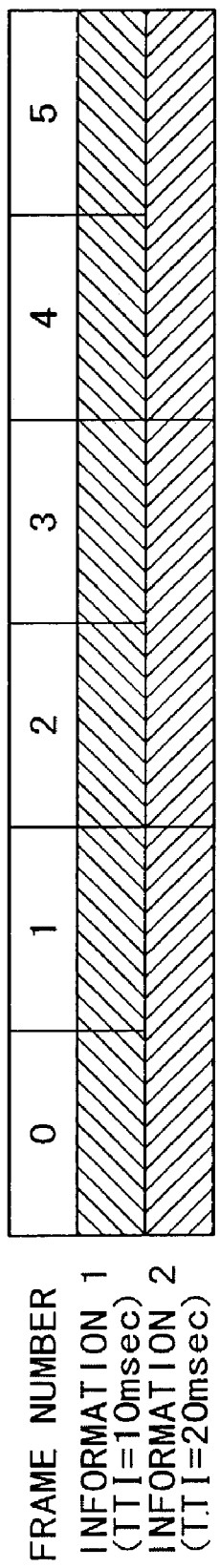

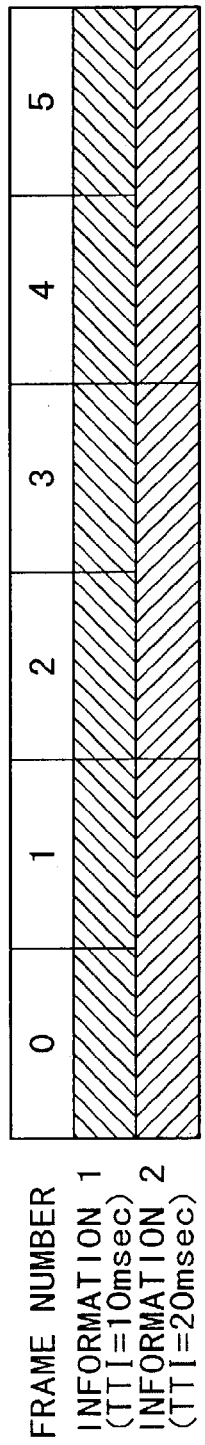
F I G. 2A
| FRAME NUMBER | 0 | 1 | 2 | 3 | 4 | 5 |
|---|---|---|---|---|---|---|
| INFORMATION 1 (TTI=10msec) | | | | | | |
| INFORMATION 2 (TTI=20msec) | | | | | | |
F I G. 2B
| TFCI VALUE | 0 | 1 | 2 | ... | 39 | 40 | ... | 63 | 64 | ... | 79 | 80 | ... | 119 | 120 | ... | 127 | 128 | ... | 159 |
|---|---|---|---|---|---|---|---|---|---|---|---|---|---|---|---|---|---|---|---|---|
| TF1 (INFORMATION 1) | 0 | 1 | 2 | ... | 39 | 0 | ... | 23 | 24 | ... | 39 | 0 | ... | 39 | 0 | ... | 7 | 8 | ... | 39 |
| TF2 (INFORMATION 2) | 0 | 0 | 0 | ... | 0 | 1 | ... | 1 | 1 | ... | 1 | 2 | ... | 2 | 3 | ... | 3 | 3 | ... | 3 |

FIG. 3A

| FRAME NUMBER | 0 | 1 | 2 | 3 | 4 | 5 |
|---|---|---|---|---|---|---|
| INFORMATION 0 (TTI=10msec) | | | | | | |
| INFORMATION 1 (TTI=20msec) | | | | | | |
| INFORMATION 2 (TTI=20msec) | | | | | | |

FIG. 3B

| TFCI VALUE | 0 | 1 | ... | 9 | 10 | ... | 19 | ... | 49 | 50 | 51 | ... | 99 | ... | 150 | 151 | ... | 199 |
|---|---|---|---|---|---|---|---|---|---|---|---|---|---|---|---|---|---|---|
| TF0 (INFORMATION 0) | 0 | 1 | ... | 9 | 0 | ... | 9 | ... | 9 | 0 | 1 | ... | 9 | ... | 0 | 1 | ... | 9 |
| TF1 (INFORMATION 1) | 0 | 0 | ... | 0 | 1 | ... | 1 | ... | 4 | 0 | 0 | ... | 4 | ... | 0 | 0 | ... | 4 |
| TF2 (INFORMATION 2) | 0 | 0 | ... | 0 | 0 | ... | 0 | ... | 0 | 1 | 1 | ... | 1 | ... | 3 | 3 | ... | 3 |

F I G. 8 A

| FRAME NUMBER | 0 | 1 | 2 | 3 | 4 | 5 |
|---|---|---|---|---|---|---|
| INFORMATION 1 (TTI=10msec) | | | | | | |
| INFORMATION 2 (TTI=20msec) | | | | | | |

F I G. 8 B

| TFCI VALUE | 0 | 1 | 2 | 3 | 4 | 5 | 6 | 7 | 8 | ... | 254 | 255 |
|---|---|---|---|---|---|---|---|---|---|---|---|---|
| TF1 (INFORMATION 1) | 0 | 0 | 1 | 2 | 3 | 0 | 1 | 2 | 3 | ... | 2 | 3 |
| TF2 (INFORMATION 2) | 0 | 0 | 0 | 0 | 1 | 1 | 1 | 1 | 2 | ... | 63 | 63 |

FIG. 11
RELATED ART

| TFCI VALUE | 0 | 1 | 2 | 3 | 4 | 5 | 6 | 7 | ... | 252 | 253 | 254 | 255 |
|---|---|---|---|---|---|---|---|---|---|---|---|---|---|
| TF1 (INFORMATION 1) | 0 | 1 | 2 | 3 | 0 | 1 | 2 | 3 | ... | 63 | 63 | 63 | 63 |
| TF2 (INFORMATION 2) | 0 | 0 | 0 | 0 | 1 | 1 | 1 | 1 | ... | 0 | 1 | 2 | 3 |

FIG. 12
RELATED ART

| INFORMATION 1 | TF1 | 0 | 1 | 2 | 3 | ...... | 63 |
|---|---|---|---|---|---|---|---|
| | INTRA-TTI DATA LENGTH | 8 | 10 | 12 | 16 | ...... | 256 |

| INFORMATION 2 | TF2 | 0 | 1 | 2 | 3 |
|---|---|---|---|---|---|
| | INTRA-TTI DATA LENGTH | 10 | 20 | 30 | 40 |

FIG. 13
RELATED ART $$bi = \sum_{n=0}^{9} (an \times Mi,n) \bmod. 2 \quad \cdots \text{(EXPRESSION(1))}$$

$$EX = \sum_{n=6}^{9} (an \times Mi,n) \bmod. 2 \quad \cdots \text{(EXPRESSION(2))}$$

$$TFCI = TF_0 + \sum_{j=1}^{n-1} \left( TF_j \cdot \prod_{i=0}^{j-1} K_i \right) \quad \cdots \text{(EXPRESSION(3))}$$

FIG. 14
RELATED ART

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

METHOD OF MULTIPLEXING INFORMATION IN MOBILE COMMUNICATIONS, METHOD AND APPARATUS FOR DECODING TRANSPORT FORMAT COMBINATION INDICATOR, AND MOBILE STATION APPARATUS, BASE STATION APPARATUS AND MOBILE COMMUNICATION SYSTEM

CROSS REFERENCE TO RELATED APPLICATIONS

This application claims priority to Japanese Patent Application No. JP 2002-031725, filed on Feb. 8, 2002, the disclosure of such application being herein incorporated by reference to the extent permitted by law.

BACKGROUND OF THE INVENTION

1. Field of the Invention

This invention relates to a method and an apparatus for decoding a Transport Format Combination Indicator (TFCI) inserted into a radio frame, in a mobile communications system using a Wideband-Code Division Multiple Access (hereinafter referred to as W-CDMA) system.

The present invention also relates to a mobile station apparatus and a base station apparatus, which include the above decoding method and the above decoding.

The present invention further relates to a method which is used for multiplexing information in mobile communications and which is suitable for the above decoding method.

2. Description of the Related Art

One method used in current mobile communications field is a method of multiplexing different pieces of information such as audio and packet having different qualities of service (hereinafter referred to as QoS) into a same radio frame and then transporting the frame through a radio circuit. One of such methods is known as a W-CDMA method being studied by a Third Generation Partnership Project (hereinafter referred to as 3GPP).

FIG. 9 shows an exemplary state of a plurality of pieces of information being multiplexed in accordance with the W-CDMA method. As shown in FIG. 9, one radio frame has a length of 10 milliseconds (hereinafter referred to as msec) and may multiplex a plurality of pieces of information in each radio frame.

The W-CDMA method used in FIG. 9 may select and set a Transmission Time Interval (hereinafter referred to as TTI and which represents the shortest time length during which data may be decoded) for each of a plurality of pieces of information to be multiplexed, out of predetermined four kinds of TTIs. The four kinds of TTIs to be selected include 10 msec, 20 msec, 40 msec and 80 msec. In a case of FIG. 9, information A has a TTI of 10 msec, information B has a TTI of 20 msec, and information C has a TTI of 10 msec.

In addition, the number of data within the TTI of each information (hereinafter, the number of data within the TTI is referred to as intra-TTI data length) may be arbitrarily selected. In other words, the W-CDMA method allows having different intra-TTI data lengths of a plurality of pieces of information to be multiplexed, even within a same type of radio frames. This allows pieces of information having different QoSs to be multiplexed and transported.

As described above, the W-CDMA method allows the pieces of information having different intra-TTI data lengths to be multiplexed and transported, so that information regarding the intra-TTI data length of each of the pieces of information to be multiplexed needs to be transmitted to a receiving side. Thus, in the W-CDMA method, a Transport Format Combination Indicator (hereinafter referred to as TFCI) is used as information indicating a combination of intra-TTI data lengths of the plurality of pieces of information to be multiplexed so as to be inserted in the radio frame as shown in FIG. 10 and transported.

In other words, as shown in FIG. 10, one frame is composed of fifteen slots, and each of the slots has the plurality of pieces of information to be multiplexed and TFCI inserted therein.

The TFCI indicates the intra-TTI data length of each piece of information by a value of a transport format of each piece of information (normally the number of the transport format). A value of the TFCI is determined with regard to a combination of values of transport formats of the plurality of pieces of information-to be multiplexed.

For example, FIG. 11 shows a case where two pieces of information having different QoS (i.e., information 1 and information 2) are multiplexed, and an exemplary mapping table showing a correspondence between a value of the Transport Format (hereinafter referred to as TF value), which represents the intra-TTI data lengths of the information 1 and the information 2, and TFCI values. TF1 and TF2 represent TF values of the information 1 and the information 2, respectively. In FIG. 11, TF1 shows that the information 1 has sixty-four kinds of intra-TTI data lengths, and TF2 shows that the information 2 has four kinds of intra-TTI data length.

In addition to the use of the TFCI, details of the intra-TTI data length of the TF values TF1 and TF2 of each piece of information and a mapping table as shown in FIG. 11 are notified through a control channel to the receiving side. FIG. 12 shows an exemplary table showing a correspondence between the TF value of each piece of information and the intra-TTI data length thereof in a case of the TF values TF1 and TF2 of the information 1 and the information 2 and the intra-TTI data lengths.

From the description above, the W-CDMA method allows the receiving side to extract the TFCI out of the received data, thereby allowing a TFCI decoder to decode the extracted TFCI to obtain the TFCI value. As a result, the TF value of each piece of information is calculated based on the table showing the correspondence between TFCIs which have been previously acquired through the control channel and the TF values. Then, the table showing the correspondence between the TF value of each piece of information and the intra-TTI data length is used to calculate the intra-TTI data length corresponding to the calculated TF value of each piece of information. Finally, received multiplexed data is divided into the information 1 and the information 2, thereby allowing respective data to be decoded.

The W-CDMA method represents the TFCI as information of 10 bits and has 1024 combinations of TF values for the plurality of pieces of information to be multiplexed. When the number of combinations of TF values for the plurality of pieces of information to be multiplexed may be expressed by 10 bits of less, the TFCIs of the pieces of information are made to have 10 bits by inserting "0" into the most significant bit (MSB) side of the TFCI.

In addition, the TFCI is encoded at a sending side for the purpose of error correction. How to encode TFCI bits in accordance with 3GPP standards will be described as follows.

When information of 10 bits of the TFCI to be inputted into an encoder are assumed to be $a_9$, $a_8$, $a_7$, $a_6$, $a_5$, $a_4$, $a_3$, $a_2$, $a_1$ and $a_0$ (wherein $a_9$ is the MSB and $a_0$ is a least significant bit (LSB)), a code word bi (i=0, ..., 31) included in an output from the encoder is calculated through an expression (1) shown in FIG. 13. In the expression (1), $M_{i,n}$ represents a coefficient acquired through the table shown in FIG. 14.

According to the 3GPP standards, the TFCI stored in one radio frame shown in FIG. 9 has a field of 30 bits. Thus, the code word bi of 32 bits is subject to a puncture processing to delete $b_{30}$ and $b_{31}$, thereby obtaining 30 bits. Thereafter, the field of 30 bits is inserted into a TFCI field of the radio frame shown in FIG. 9. Subsequently, data of the radio frame shown in FIG. 9 is subject to a QPSK modulation and further subject to a spectrum diffusion modulation, to then transport the data.

The data in the radio frame as described above is received by a base station or a mobile station (e.g., mobile terminal). Then, the received data is subject to an extraction to extract a TFCI code word from the TFCI field, thereby decoding the extracted TFCI code word as described in the following. Thereafter, the TFCI value of the decoded TFCI code word is checked in order to detect the correspondence between each of the plurality of pieces of information being multiplexed and the intra-TTI data length by referring to the table which has been previously sent from the control channel. The detected correspondence is used as a base for dividing the plurality of pieces of information being multiplexed, to then decode the plurality of pieces of information.

FIG. 15 shows an example of a configuration of a decoding section of TFCI code word. A received signal is subject to an inverse diffusion to collect TFCI code words inserted in the radio frame, then inputting the collected TFCI code words into a de-puncture processing section 1. The de-puncture processing section 1 inserts two "0"s into the last part of the inputted 30 bits of TFCI code word, thereby obtaining 32 bits of TFCI code word. The TFCI code word which has been inserted with 2 bits of "0" is represented as Ri (where i=0, 1, ..., 31).

The TFCI code word Ri of 32 bits is supplied to a de-masking processing section 2. The de-masking processing section 2 performs a de-masking processing that corresponds to the one using $M_{i,6}$ to $M_{i,9}$ of the above described coefficients $M_{i,n}$ shown in FIG. 14. In other words, the coefficients $M_{i,6}$ to $M_{i,9}$ among the coefficients $M_{i,n}$ are mask codes and are used by the de-masking processing section 2 for removing a mask. The specific de-masking processing will be performed according to the following procedures of ① and ②.

① A value is selected which may be a candidate for high-order four bits ($a_9$, $a_8$, $a_7$, $a_6$) of the TFCI corresponding to the mask codes $M_{i,9}$. When the TFCI may take values ranging from 0 to 255, for instance, the value of the TFCI may be expressed by 8 bits and thus 2 bits $a_9$ and $a_8$ from the most significant bit of 10 bits of the TFCI is "0". In this case, $a_7$ and $a_6$ may take "0" or "1" and thus, there are four patterns of high-order four bits of the TFCI.

② An expression (2) shown in FIG. 13 is used to obtain a value of EX. If the result shows the value EX="1", a plus or minus sign of "Ri" is inverted and, if the result shows the value EX="0", "Ri" is left as it is. This processing is performed for all of the values of "Ri" where i=0,1, ... 31.

Next, the data which has been de-masked by the de-masking processing section 2 is subject to a fast Hadamard transformation (FHT) by a fast Hadamard transformation section 3 to obtain a correlation value. The fast Hadamard transformation is a calculation method of efficiently performing a multiplication of the de-masked data and a Hadamard matrix.

The above processing according to the procedures of ① and ② is performed to all possible patterns of candidates of high-order four bits of the TFCI ($a_9$, $a_8$, $a_7$, $a_6$). In the case of the above-described FIG. 11 where the TFCI may take the values ranging from 0 to 225, the candidates of bits $a_9$, $a_8$, $a_7$, $a_6$ may take four patterns as described above and thus, the de-masking processing and the fast Hadamard transformation processing are repeated total of four times. In a case where the TFCI value is 512 or more and all of 10 bits of the TFCI is used, the candidates of bits $a_9$, $a_8$, $a_7$, $a_6$ may take 16 patterns and thus, the de-masking processing and the fast Hadamard transformation processing are repeated total of 16 times.

All of the results of repeating the de-masking processing and the fast Hadamard transformation processing a plurality of times are supplied to a correlation computation section 4. This correlation computation section 4 compares absolute values of all correlation values acquired through the above-described plurality of outputs by the fast Hadamard transformation section 4 to detect a maximum value of the absolute values, thereby obtaining a TFCI value which has been transmitted.

With regard to the TFCI value thus obtained, the mapping table as shown in FIG. 11 which has been previously sent by the control channel and the table shown in FIG. 12 are referred as described above to find the intra-TTI data length of the information being multiplexed, thereby dividing the multiplexed data into each piece of information for decoding.

It is noted that each of the processing sections shown in FIG. 15 may be separately configured as an independent hardware, or a part or the entirety of the processing sections shown in FIG. 15 maybe configured as a Digital Signal Processor (DSP).

SUMMARY OF THE INVENTION

As described above, the conventional decoding of the TFCI according to the W-CDMA method has required the de-masking processing and the fast Hadamard transformation processing to be repeated for all possible patterns of the candidates of TFCI high-order four bits ($a_9$, $a_8$, $a_7$, $a_6$). The repeated number of processing caused extended time of a decoding processing of the TFCI and an increased amount of power consumption.

A case will be considered, for example, where the information 1 and the information 2 having different QoSs are multiplexed and transported wherein the information 1 is assumed to have the Transmission Time Interval TTI of 10 msec and the information 2 is also assumed to have the TTI of 20 msec, for instance. In such case, the information 1 and the information 2 superimposed on radio frames are as shown in FIG. 16, so that the TF value TF1 of the information 1 may change every 10 msec whereas the TF value TF2 of the information 2 does not change during the period of 20 msec.

In a conventional decoding system, the encoded data of the TFCI being inserted into a TFCI field of the radio frame is collected to independently decode the obtained data of the TFCI. In the case of the decoding as shown in FIG. 16, TFCIs of the information 1 and the information 2 are independently decoded every 10 msec. Thus, even the information 2 having a single value of the TF value TF2 needs to be subject to a calculation for obtaining the IF value TF2 in the middle of the period of TTI of 20 msec, resulting in a problem where the decoding processing time and power consumption are wasted.

In view of the above problems, there is a need for allowing a decoding process of TFCI to reduce the waste of decoding processing time and power consumption and, in other words, to realize a reduced time as well as a reduced power consumption for decoding the TFCI.

In order to solve the above problems, when the present invention according to one preferred mode is applied to the above-described W-CDMA method according to the 3GPP standards, a method of multiplexing information in mobile communications is provided. In other words, in the mobile communications performed such that a plurality of pieces of information are multiplexed into a same radio frame to transport the multiplexed plurality of pieces of information through a radio circuit, wherein a Transport Format Combination Indicator (TFCI) indicating a combination of the number of data within Transmission Time Interval (TTI) (hereinafter, the number of data within Transmission Time Interval is referred to as intra-TTI data length) for each of the plurality of pieces of information is inserted into each radio frame and is transported, and wherein for the plurality of pieces of information, the Transmission Time Intervals which are the shortest time lengths during which data may be decoded are selected from a plurality of predetermined combinations of Transmission Time Intervals, the method comprises the step of selecting and transporting the TFCI such that a change in the number of data within the Transmission Time Interval of information for which the Transmission Time Intervals is longer corresponds to a change of high-order bits of the TFCI.

In a case where information 1 having 10 msec of Transmission Time Interval and information 2 having 20 msec of Transmission Time Interval are multiplexed, for instance, the intra-TTI data length of the information 2 has a determined value that does not change within the period of 20 msec.

According to a preferred embodiment of the present invention having the above-described configuration, when the intra-TTI data length of information having longer Transmission Time Interval is determined, a range of values that a TFCI value may take is limited. Thus, the number of patterns having candidates for TFCI high-order four bits ($a_9$, $a_8$, $a_7$, $a_6$) having a relation with a mask code may take is reduced, thereby allowing a proportional reduction in the number of the de-masking processing and the fast Hadamard transformation processing.

When another preferred embodiment of the present invention is applied to the W-CDMA method according to the 3GPP standards, a method of decoding Transport Format Combination Indicator (TFCI) is provided. In other words, in a method of decoding the TFCI in mobile communications performed such that a plurality of pieces of information are multiplexed into a same radio frame to transport the multiplexed plurality of pieces of information through a radio circuit, wherein the TFCI indicating a combination of the number of data within Transmission Time Interval for each of the plurality of pieces of information is inserted into each radio frame and is transported, and wherein for the plurality of pieces of information, the Transmission Time Intervals which are the shortest time lengths during which data may be decoded are selected from a plurality of predetermined combinations of Transmission Time Interval, the method comprises a control information reception step for receiving control information indicating a relation among the Transmission Time Interval for each of the plurality of pieces of information, the TFCI and the number of data within the Transmission Time Interval with regard to the plurality of pieces of information, wherein the Transmission Time Interval is transmitted through a circuit different from the one used for transmission of the plurality of pieces of information, a determination step for analyzing the control information received in the control information reception step to determine whether a change in the number of data within the Transmission Time Interval of information for which the Transmission Time Interval is longer corresponds to a change in high-order bits of the TFCI, a standard decoding step for performing a normal decoding method where, when the determination step results in a negative determination result, the TFCI inserted into the radio frame is independently decoded for each of the Transmission Time Intervals of the plurality of pieces of information, and a high-speed decoding step for decoding, when the determination step results in a positive determination result, the number of data within the Transmission Time Interval of information having a longest Transmission Time Interval which is determined by the latest decoding of the TFCI is used as a base for limiting candidates of the TFCIs to be decoded next, thereby decoding the TFCIs.

According to another preferred embodiment of the present invention having the above-described configuration, the intra-TTI data length of information having longer Transmission Time Interval which is determined by the latest decoding of the TFCI is used as the base for limiting the candidates of the TFCIs to be decoded next.

Thus, the high-speed decoding step is allowed to have reduced number of bits which change as a mask code when the limitation on TFCI candidates is performed by high-order four bits of the TFCI (i.e., bits corresponding to the mask code), thereby allowing a reduction in the number of the de-masking processing and the fast Hadamard transformation processing.

Furthermore, the limitation on TFCI candidates performed by low-order six bits of TFCI allows the fast Hadamard transformation processing to have a reduced number of computations, thereby enabling a more high-speed TFCI processing.

As described above, the present invention allows the decoding processing of the TFCI to be performed with high-speed and thus with lower energy consumption as compared to the conventional, prior art.

BRIEF DESCRIPTION OF THE DRAWINGS

The foregoing and other objects and features of the invention will be become apparent to those skille3d in the art from the following description of preferred embodiments of the invention taken in conjunction with reference to the accompanying drawings, in which:

FIG. 1A and FIG. 1B illustrate an embodiment of a method of multiplexing information in mobile communications according to a preferred embodiment of the present invention;

FIG. 2A and FIG. 2B illustrate an embodiment of a method of multiplexing information in mobile communications according to a preferred embodiment of the present invention;

FIG. 3A and FIG. 3B illustrate an embodiment of a method of multiplexing information in mobile communications according to a preferred embodiment of the present invention;

FIG. 8A and FIG. 8B illustrate another embodiment of a method of multiplexing information in mobile communications according to a preferred embodiment of the present invention;

FIG. 11 illustrates an exemplary mapping table showing a correspondence between a TFCI and a TF value of each piece of information being multiplexed;

FIG. 12 illustrates an exemplary mapping table showing the correspondence between the TF value of each piece of information being multiplexed and an intra-TTI data length;

FIG. 13 shows expressions used for a description of a preferred embodiment of the present invention;

FIG. 14 describes a coefficient $M_{i,n}$ used for encoding TFCI;

DETAILED DESCRIPTION OF THE PREFERRED EMBODIMENTS OF THE INVENTION

Embodiments of a method of multiplexing information will be now described as follows.

Figure 16:
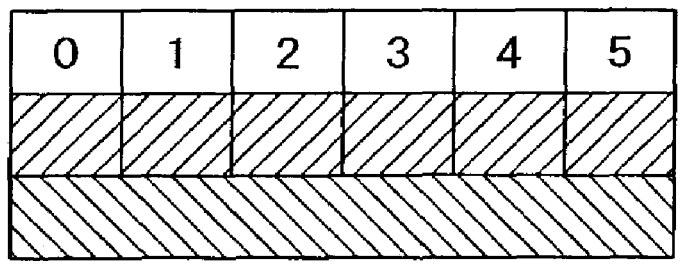
FIG. 16 illustrates information being multiplexed according to the W-CDMA method according to the 3GPP standards.

FIG. 1 illustrates a piece of transport information being multiplexed by the present embodiment. In this embodiment, information 1 and information 2 having different QoSs are multiplexed and transported FIG. 1(A) illustrates a relation between a frame number and the information 1 and 2 on a time scale. In this embodiment, the information 1 has a Transmission Time Interval (TTI) of 10 msec and the information 2 has a TTI of 20 msec, as with the case with FIG. 16. These pieces of information multiplexed may take four different TTIs of 10 msec, 20 msec, 40 msec and 80 msec, as described above.

FIG. 1(B) illustrates an exemplary mapping table showing a correspondence between TF values TF1 and TF2 of the information 1 and the information 2 in the present embodiment and TFCI values. In FIG. 1(B), it is assumed that TF1 may take any value among "0" to "63". Thus, the information 1 has sixty-four different intra-TTI data lengths. It is also assumed that TF2 may take any value among "0" to "3". Thus, the information 2 has four different intra-TTI data lengths.

In the present embodiment, a mapping for obtaining the correspondence between the TFCI value and the TF values TF1 and TF2 is performed such that a determined (unchanged) intra-TTI data length of information having a longer TTI provides a limited range of TFCI values, as shown in FIG. 1(B).

In the example of preferred embodiment of FIG. 1(B), all of the TF values TF1 which the information 1 may take (i.e., "0" to "63") correspond to the TF values TF2 of the information 2, respectively. Thus, the information 2 having the TF value TF2 of "0" corresponds to the TFCI values of "0" to "63", the information 2 having the TF value TF2 of "1" corresponds to the TFCI values of "64" to "127", the information 2 having the TF value TF2 of "2" corresponds to the TFCI values of "128" to "191", and the information 2 having the TF value TF2 of "3" corresponds to the TFCI values of "192" to "255".

The above correspondence among TF1 and TF2 and TFCI allows a change of the TF value TF2 of the information having longer Transmission Time Interval to correspond to a change of high-order bits of the TFCI.

The mapping as described above for inserting the TFCI into a radio frame and for performing data transport allows, as described below, a receiving side to perform the de-masking processing and the fast Hadamard transformation processing less number of times.

In the example of preferred embodiment of FIG. 1, the TFCI has values of "0" to "255" and valid bits are 8 bits. Thus, the number of patterns which candidates of high-order four bits of the TFCI ($a_9$, $a_8$, $a_7$, $a_6$) relates to a mask code may take when the TFCI is decoded is four because bits of $a_7$ and $a_6$ are valid bits and bits of $a_9$ and $a_8$ are "0".

Due to the above reason, the conventional independent decoding of the TFCI requires one frame to be subject to four times of the de-masking processing and four times of the fast Hadamard transformation processing, respectively.

In contrast, the present embodiment may reduce the number of times of the de-masking processing and the fast Hadamard transformation processing by the following procedure.

In other words, the procedure of the present embodiment firstly decode the TFCI in a frame number "0" as usual to obtain TF values TF1 and TF2 of each piece of information 1 and information 2. In the present embodiment, there is no difference between the TF value TF1 of the information 1 of the next frame number "1" and the TF value TF2 of the information 2 of the next frame number "1".

This means that in a decoding of the TFCI for detecting the TF value of the information 1 in the frame number "1", the TF value TF2 of the information 2 which has been already detected and determined (i.e., does not change) in the frame number "0" is used to limit the range of TFCI values.

For instance, a case will be considered where the TF2 value which has been detected and determined in the frame number "0" is "0". In this case, the range of TFCI values is limited to "0" to "63". In this range, TFCI high-order four bits ($a_9$, $a_8$, $a_7$, $a_6$) may take only one pattern of (0, 0, 0, 0) and thus, the de-masking processing and the fast Hadamard transformation processing need to be performed only one time, respectively.

Another case will be considered where the TF2 value which has been detected and determined in the frame number "0" is "1". In this case, the range of TFCI values is limited to "64" to "127". In this range, TFCI high-order four bits ($a_9$, $a_8$, $a_7$, $a_6$) may take only one pattern of (0, 0, 0, 1) and thus, the de-masking processing and the fast Hadamard transformation processing need to be performed only one time, respectively.

Still another case will be considered where the TF2 value which has been detected and determined in the frame number "0" is "2". In this case, the range of TFCI values is limited to "128" to "191". In this range, TFCI high-order four bits ($a_9$, $a_8$, $a_7$, $a_6$) may take only one pattern of (0, 0, 1, 0) and thus, the de-masking processing and the fast Hadamard transformation processing need to be performed only one time, respectively.

Still another case will be considered where the TF2 value which has been detected and determined in the frame number "0" is "3". In this case, the range of TFCI values is limited to "192" to "255". In this range, TFCI high-order four bits ($a_9$, $a_8$, $a_7$, $a_6$) may take only one pattern of (0, 0, 1, 1) and thus, the de-masking processing and the fast Hadamard transformation processing need to be performed only one time, respectively.

As described above, the TFCI value is selected in accordance with the above-described embodiment to multiplex and transport a plurality of pieces of information, thereby allowing the receiving side to realize a reduced time as well as reduced power consumption for decoding the TFCI.

In the above preferred embodiment of the present invention, the number of repetitions of the de-masking processing and the fast Hadamard transformation for decoding the TFCI is reduced to realize reduced time as well as the reduced power consumption for decoding the TFCI, as described above.

However, even in a case where the TFCI value is not related to the TFCI high-order four bits ($a_9$, $a_8$, $a_7$, $a_6$) corresponding to mask codes $M_{i,6}$ to $M_{i,9}$, the mapping of FIG. 1 as described above allows TFCI candidates to be limited and thus, allows the number of computations in the fast Hadamard transformation processing (i.e., the number of addition and subtraction) to be reduced, thereby allowing a proportional increase in the speed of decoding the TFCI value.

The number of computations in the fast Hadamard transformation is about 160 in a case of 5 bits of TFCI, about 80 in a case of 4 bits of TFCI, about 48 in a case of 3 bits of TFCI, about 36 in a case of 2 bits of TFCI, and about 32 in a case of 1 bit of TFCI, for instance. Thus, performing the mapping as shown in FIG. 1 limits the TFCI candidates and thus, reduces the number of bits of the TFCI candidates, which allows the number of computations in the fast Hadamard transformation to be reduced, thereby allowing a proportional increase in the speed of decoding the TFCI value. The number of comparisons of correlation values is also reduced by an amount which is proportional to the above reduced number of computations in the fast Hadamard transformation thereby also allowing a proportional increase in speed.

In the example of preferred embodiment of FIG. 1, the number of TF values that the information 1 may take is 64 (i.e., the power of 2) and thus, the change of the information 2 having longer Transmission Time Interval corresponds to bit segments. Consequently, the decoding of the TFCI only requires one time of the de-masking processing and one time of the fast Hadamard transformation processing, respectively, as described above.

It is noted, however, that according to the preferred embodiment of the present invention, the TF value that the information 1 having shorter Transmission Time Interval may take, does not have necessarily to be a power of 2 and, even in this case, the decoding of the TFCI is allowed to have a reduced number of the de-masking processing and the fast Hadamard transformation processing.

FIG. 2 illustrates a case where transport information is multiplexed when the TF value that the information 1 having shorter Transmission Time Interval may take is a number other than the power of 2. In the example of preferred embodiment of FIGS. 2(A) and 2(B), the information 1 and the information 2 having Transmission Time Intervals similar to those shown in FIG. 1 are multiplexed, as shown in FIG. 2(A).

FIG. 2(B) illustrates an exemplary mapping table showing the correspondence between the TF values TF1 and TF2 of the information 1 and the information 2 in the present embodiment and the TFCI values. In the example of preferred embodiment of FIG. 2, it is assumed that TF1 may take any value among "0" to "39". Thus, the information 1 has forty different intra-TTI data lengths. It is also assumed that TF2 may take any value among "0" to "3". Thus, the information 2 has four different intra-TTI data lengths.

In the example of preferred embodiment of FIG. 2, the TFCI has values of "0" to "159" and valid bits are 8 bits. Thus, the number of patterns that candidates of high-order four bits of TFCI ($a_9$, $a_8$, $a_7$, $a_6$) related to the mask code may take when the TFCI is decoded is three, i.e., (0, 0, 0, 0), (0, 0, 0, 1) and (0, 0, 1, 0). As a result, the conventional independent decoding of TFCI requires one frame to be subject to three times of the de-masking processing and three times of the fast Hadamard transformation processing, respectively.

In contrast, the present embodiment may reduce the number of times of the de-masking processing and the fast Hadamard transformation processing to two or less by the following procedure.

In other words, the procedure of present embodiment firstly decode the TFCI in a frame number "0" as usual to obtain the TF values TF1 and TF2 of each piece of information 1 and information 2. In the present embodiment, there is no difference between the TF value TF1 of the information 1 of the next frame number "1" and the TF value TF2 of the information 2 of the next frame number "1".

At this event, in the decoding of the TFCI for detecting the TF value of the information 1 in the frame number "1", the TF value TF2 of the information 2 which has been already detected and determined in the frame number "0" is used to limit the range of TFCI values.

For instance, a case will be considered where the TF2 value which has been detected and determined in the frame number "0" is "0". In this case, the number of TFCI values is limited to "0" to "39". In this range, TFCI high-order four bits ($a_9$, $a_8$, $a_7$, $a_6$) may take only one pattern of (0, 0, 0, 0) and thus, the de-masking processing and the fast Hadamard transformation processing need to be performed only one time, respectively.

In addition, another case will be considered where the TF2 value which has been detected and determined in the frame number "0" is "1". In this case, the range of TFCI values is limited to "40" to "79". In this range, TFCI high-order four bits ($a_9$, $a_8$, $a_7$, $a_6$) may take only two patterns of (0, 0, 0, 0) and (0, 0, 0, 1) and thus, the de-masking processing and the fast Hadamard transformation processing need to be performed only two times, respectively.

Still another case will be considered where the TF2 value which has been detected and determined in the frame number "0" is "2". In this case, the range of TFCI values is limited to "80" to "119". In this range, TFCI high-order four bits ($a_9$, $a_8$, $a_7$, $a_6$) may take only one pattern of (0, 0, 0, 1) and thus, the de-masking processing and the fast Hadamard transformation processing need to be performed only one time, respectively.

Still another case will be considered where the TF2 value which has been detected and determined in the frame number "0" is "3". In this case, the range of TFCI values is limited to "120" to "159". In this range, TFCI high-order four bits ($a_9, a_8, a_7, a_6$) may take only two patterns of (0, 0, 0, 1) and (0, 0, 1, 0) and thus, the de-masking processing and the fast Hadamard transformation processing need to be performed only two times, respectively.

Although the above preferred embodiments describing a case where the number of pieces of information multiplexed is two, the present invention is also applicable to a case where the number of pieces of information multiplexed is three or more. Even in this case, the change of the TF value of the information having longer or longest Transmission Time Interval is made to correspond to the change of TFCI high-order bits, thereby realizing a reduced time as well as a reduced power consumption of decoding the TFCI.

N(N represents an integer of two or more) pieces of information are arranged in the order of Transmission Time Interval (TTI) starting from a shorter TTI. Then, the number of TF values of each of the pieces of information is specified as $K_0, K_1, \ldots, K_{N-1}$ and the TF value of each of the pieces of information is specified as $TF_0, TF_1, \ldots, TF_{N-1}$, thereby calculating the TFCI value by an expression (3) shown in FIG. 13. It is noted that the calculation represented by $\pi K_i$ in a bracket shown in this expression (3) represents the power of $K_j$.

FIG. 3 shows an exemplary mapping table showing a correspondence between the TF value and the TFCI value in a case where pieces of information to be multiplexed are three pieces of information 0, information 1, and information 2. In this case, the information 0 has the TTI of 10 msec and ten TF values, the information 1 has the TTI of 20 msec and five TF values, and the information 2 has the TTI of 20 msec and four TF values, for instance.

As it may be seen from FIG. 3, when the information 2 having longer TTI has a determined TF value TF2 or when the information 1 has a determined TF value TF1, the range of TFCI values is limited. For instance, when TF2 is "0" and TF1 is "0", the TFCI values are in the range of "0" to "9" and a pattern which TFCI high-order four bits ($a_9, a_8, a_7, a_6$) may take is only one pattern of (0, 0, 0, 0), thereby requiring the de-masking processing and the fast Hadamard transformation processing to be performed only one time, respectively.

It is noted as described above that pieces of information shown in the tables of FIGS. 1(A) and 1(B), FIGS. 2(A) and 2(B), and FIGS. 3(A) and 3(B) and pieces of information to be multiplexed have TTI, respectively. Each of these TTIs is transmitted by the control channel to the receiving side prior to the data transport.

Preferred embodiments of a method and an apparatus for decoding the TFCI will be now described.

Figure 4:
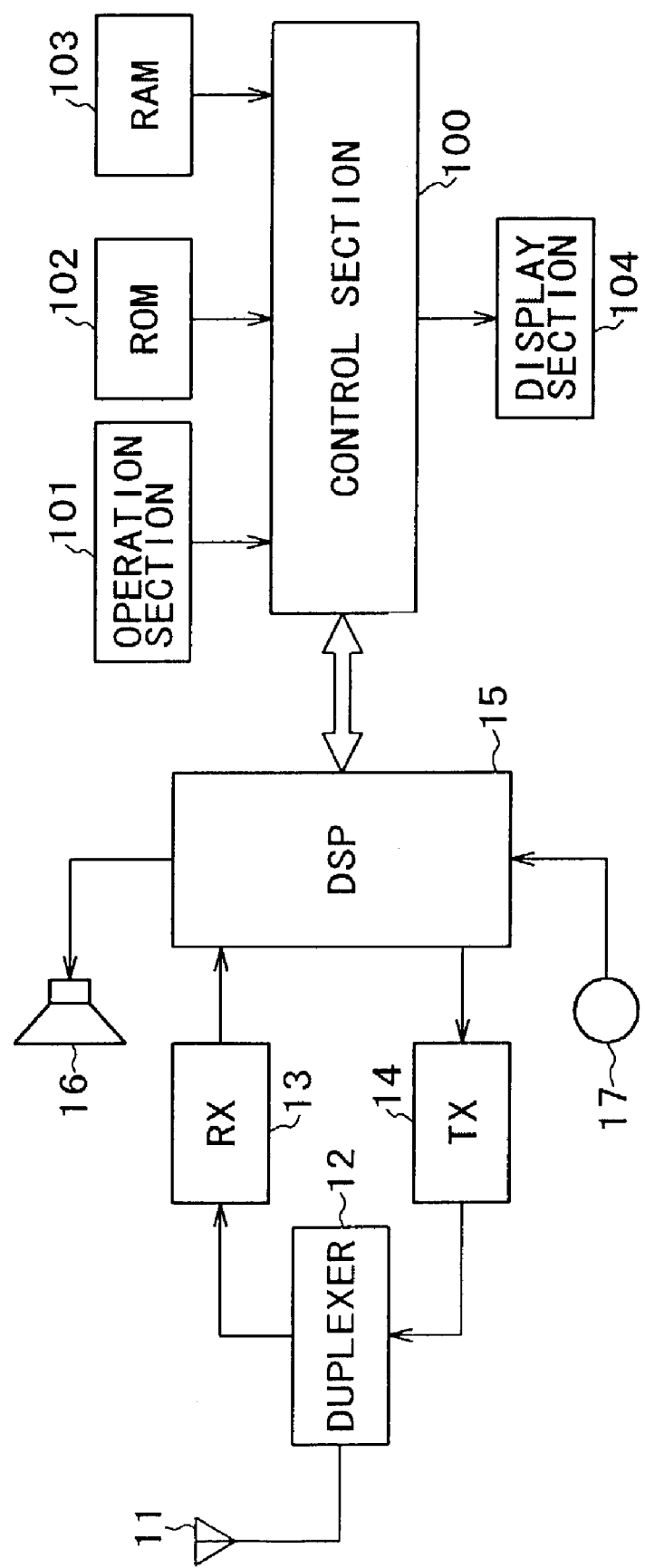
FIG. 4 is a block diagram illustrating a configuration of a mobile information terminal as one of mobile station apparatuses according to a preferred embodiment of the present invention.

Before describing an apparatus for decoding the TFCI according to a preferred embodiment of the present invention, an exemplary configuration of a mobile phone terminal is shown in FIG. 4 as a mobile station apparatus on which the present TFCI decoding apparatus is mounted.

A signal received by an antenna 11 is supplied to a reception section 13 through a duplexer 12. The reception section 13 subjects a signal being subject to a spectral diffusion to an inverse spectral diffusion and a QPSK demodulation. The data which has been subject to a demodulation is supplied to a Digital Signal Processor (hereinafter referred to as DSP) 15 and decoded as described in detail later.

Among the decoded data, a control data portion which has been transmitted through the control channel is sent to a control section 100. Also among the decoded data, an audio signal is supplied from the DSP 15 to a speaker 16, thereby being emitted in audio form.

Figure 9:
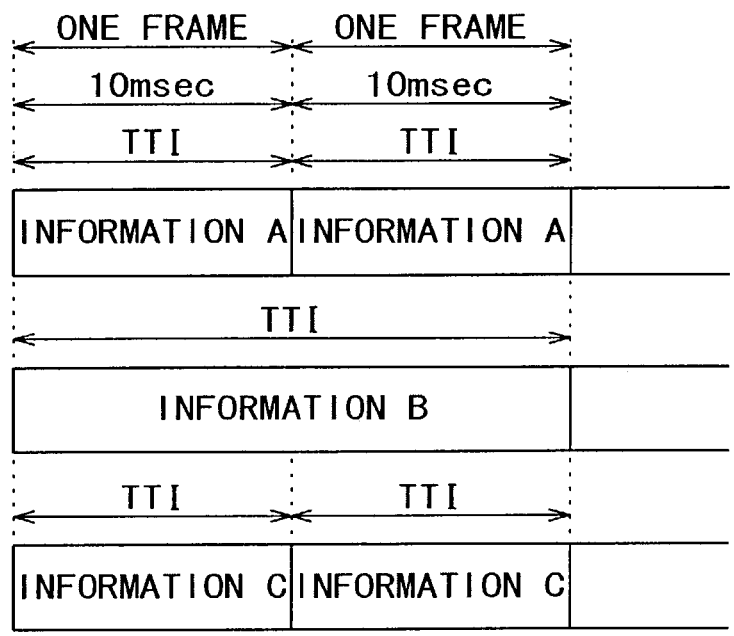
FIG. 9 illustrates the information multiplexed according to a W-CDMA method according to the 3GPP standards.
Figure 10:
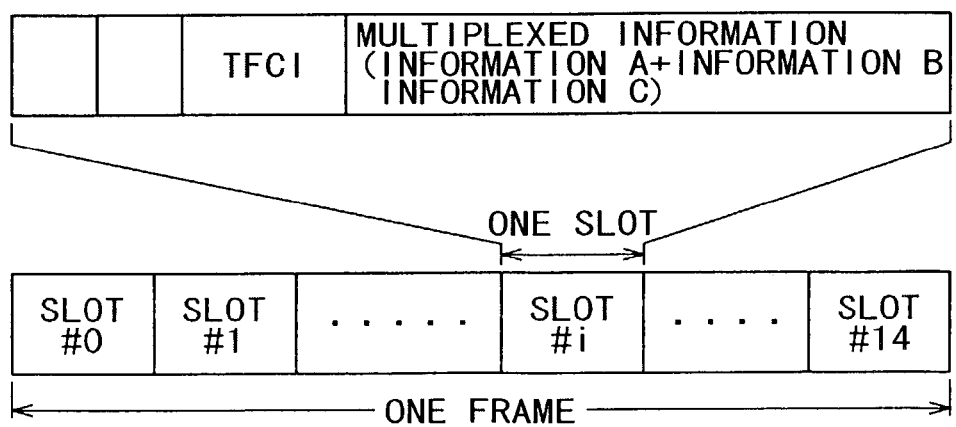
FIG. 10 illustrates transport data according to the W-CDMA method according to the 3GPP standards.
Figure 15:
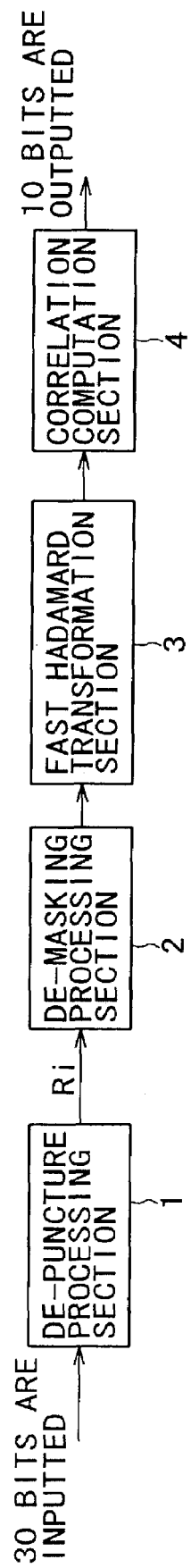
FIG. 15 illustrates an exemplary configuration of a TFCI decoder.

In addition, the audio signal coming from a microphone 17 is supplied to the DSP 15 and converted into a signal which is segmentalized into frames in accordance with the above-described format shown in FIG. 9, thereby being supplied from the DSP 15 to a transmission section 14. The transmission section subjects the signal to a QPSK modulation and a spectrum diffusion modulation processing to send the signal through the duplexer 12 to the antenna 11. The control data coming from the control section 100 is similarly processed through the DSP 15, thereby being sent through the control channel to a base station.

The control section 100 is composed of a CPU and is connected with an operation section 101, a ROM 102 having programs therein, a RAM 103 as a working area and a display section 104 composed of an LCD.

The operation section 101 includes a numeric dial key, an on-hook key, an off-hook key, a cursor key and the like. The control section 100 switches and controls, in accordance with the operation of these keys by a user, various functions such as reception and transmission.

Figure 5:
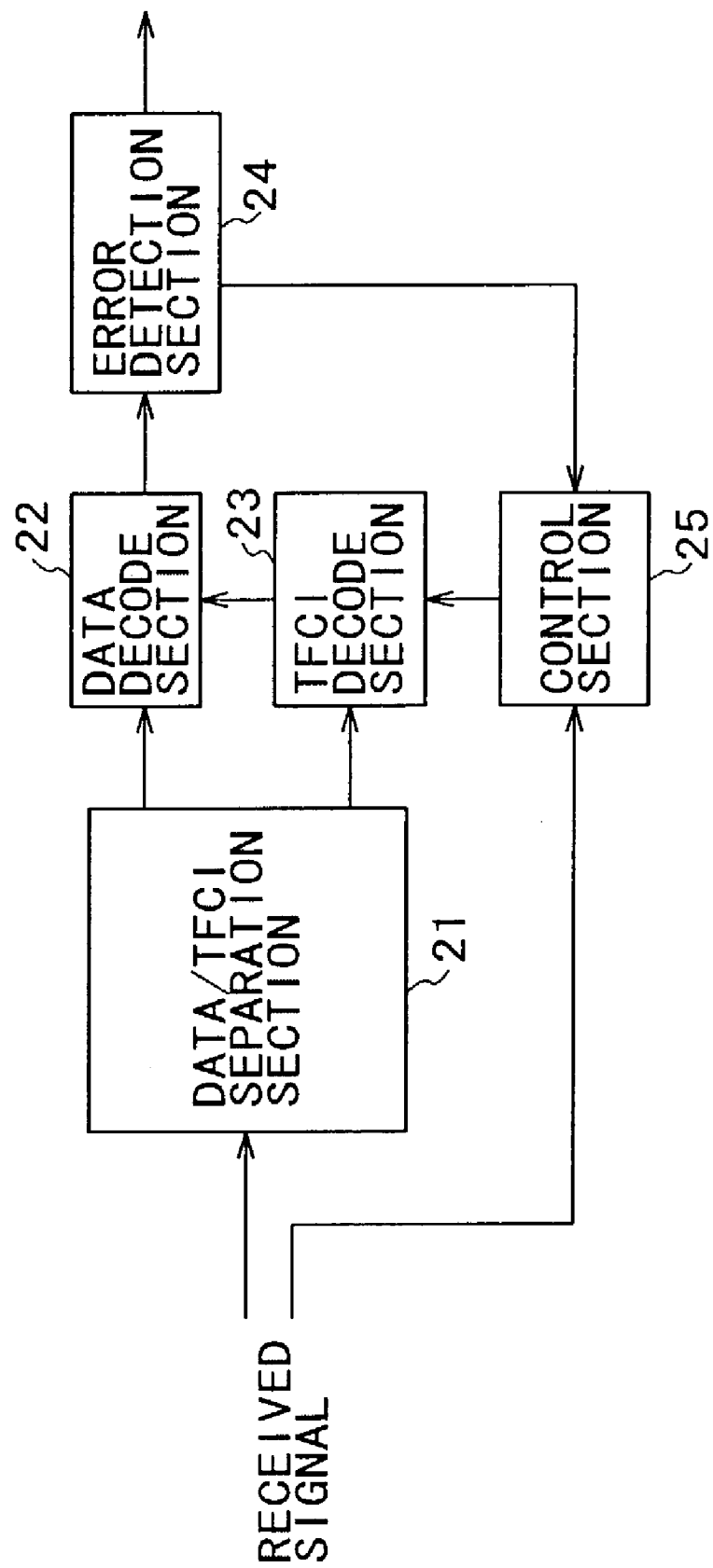
FIG. 5 is a block diagram illustrating a portion of the function of FIG. 4.

In the present preferred embodiment, a received data decoding processing section is included in the interior of the DSP 15. FIG. 5 shows a block diagram of a structure of the received data decoding processing section, in other words, a processing function of the received data decoding processing section.

The received data decoding processing section shown in the example of preferred embodiment of FIG. 5 is composed of a data/TFCI separation section 21 for separating the received signal into data and the TFCI, a data decoding section 22 for receiving the data from the data/TFCI separation section 21 to subject the data to a decod processing, a TFCI decoding section 23 for receiving the TFCI from the data/TFCI separation section 21 to subject the TFCI to decoding, an error detection section 24 for detecting an error in the data which has been decoded by the data decoding section 22 and a control section 25 for controlling the TFCI decoding section 23.

The data/TFCI separation section 21 separates the received data into a data part and a TFCI part, there by supplying the data part to the data decoding section 22 and supplying the TFCI part to the TFCI decoding section 23.

Each piece of information is decoded by the data decoding section 22 based on an intra-TTI data length value of each of a plurality of pieces of information to be multiplexed which have been sent from the TFCI decoding section 23 and a value of the Transmission Time Interval. The decoded piece of information is supplied by the data decoding section 22 to the error detection section 24.

The data sent from the data decoding section 22 is subject to error detection by the error detection section 24, and a result thereof is notified to the control section 25. When no error is detected in the data, the data is outputted.

The control section 25 analyzes the control information which is sent prior to the multiplexed data and which is sent through the control channel to detect the Transmission Time Interval of each of the plurality of pieces of information to be multiplexed, thereby notifying the result to the TFCI decoding section 23. At the same time, the control section 25 also detects pieces of information in the table showing the correspondence between the TFCI values from the control information and the TF value of each piece of information and, pieces of information in another table showing the correspondence between the TF value and the intra-TTI data length of each piece of information. As a result, the control section 25 sends, to the TFCI decoding section 23, information and/or a control signal needed for decoding the TFCI, thereby controlling the operation for decoding the TFCI.

In addition, the control section 25 also receives the result of the error detection by the error detection section 24 to determine whether the TFCI value acquired through the TFCI decoding section 23 is correct or not. When the error detection section 24 detects no error in the data, the control section 25 controls the TFCI decoding section 23 such that the TFCI value decoded by the TFCI decoding section 23 is used as a determined value.

The TFCI decoding section 23, which is being controlled by the control section 25 as described above, decodes the TFCI to obtain the TF value of each piece of information and to obtain the intra-TTI data length of each piece of information, thereby transmitting the obtained results and the information for the Transmission Time Interval to the data decoding section 22 for data decoding.

Next, an operation of the received data decoding processing section shown in FIG. 5 will be described with reference to the flowcharts shown in FIGS. 6 and 7.

First, the received data decoding processing section receives control information sent through the control channel, in Step S101. The received control information includes information regarding the mapping table showing the correspondences between TFCIs and TF values of the plurality of pieces of information, information regarding the mapping table showing the correspondence between the TF value and the intra-TTI data length of each of the plurality of pieces of information and information regarding the Transmission Time Interval of each of the plurality of pieces of information.

Next, the received data decoding processing section analyzes the received control information, in Step S102. In this analysis, the received data decoding processing section detects the Transmission Time Interval of each of the plurality of pieces of information to be multiplexed which have been transported and also detects the information regarding the table showing the correspondence between the TFCI value and a TF value of each piece of information and information regarding the table showing the correspondence between the TF value and the intra-TTI data length of each piece of information, thereby detecting the number of valid bits of the TFCI and/or the details of a mapping between TFCIs and TF values of the plurality of pieces of information multiplexed.

Then, the control section 25 determines whether the number of valid bits of the TFCI is equal to or greater than 7 bits associated with the mask code, in Step S103. When the number of valid bits of the TFCI is equal to or greater than 7 bits and is not associated with the mask code as described above, the number of patterns which the TFCI may take when the TFCI is decoded as a candidate of high-order four bits ($a_9$, $a_8$, $a_7$, $a_6$) as the mask code is only one pattern of (0, 0, 0, 0). Thus, the conventional standard decoding processing is performed, in Step S107. This standard decoding processing is performed until the data reception is finished and, when the data reception is determined to be finished, in Step S108, the reception decoding processing routine is finished.

In addition, when it is determined in Step 103 that the number of valid bits of the TFCI is equal to or greater than 7 bits, on the other hand, the analysis result obtained in Step S102 is used as a base for determining whether the TFCI is prepared by mappings as shown in the preferred embodiments of FIG. 1, FIG. 2 and FIG. 3 and the number through which the de-masking processing and the fast Hadamard transformation are repeated is reduced to allow a high-speed decoding or not, in Step S104, as described above.

The determination step of Step S104 is not necessary if a sending side having the TFCI valid bits equal to or greater than 7 bits is always involved with a mapping of the TFCI for enabling the high-speed decoding of the TFCI as described above.

When Step S104 results in the details of the mapping which are inappropriate for the high-speed decoding of TFCI, the processing proceeds to Step S107 where the conventional standard decoding processing is performed as described above.

When Step S104 results in the details of the mapping which are appropriate for the high-speed decoding of the TFCI, on the other hand, a determined TF value of information having the longer Transmission Time Interval as described above is used to limit the range of values which the TFCI may take, thereby reducing the number of the repetition of the de-masking processing and the fast Hadamard transformation processing and performing the high-speed decoding processing of the TFCI, in Step S105.

In addition, this high-speed decoding processing is performed until data reception is finished and, when the data reception is determined to be finished, in Step S106, this reception decoding processing routine is finished.

Next, an operation of the high-speed decoding processing of Step S105 will be described with reference to the flowchart shown in FIG. 7. The following description of the present specification assumes that two pieces of information (i.e., information 1 and 2) as shown in FIG. 1 are multiplexed, for instance.

First, TFCI candidates are initialized. In the case of FIG. 1(B), for instance, the TFCI candidates are initialized on the assumption that the TFCI values range from "0" to "255", in Step S201. Next, information being multiplexed and the TFCI are received, in Step S202. Then, the TFCI decoding section 23 uses information regarding the TFCI candidates from the control section 25 to decode the TFCI, in Step S203. For the first frame, the TFCI candidates range from "0" to "255". For the other frames, the TFCI candidates may be more limited as described later.

Next, the data decoding section 22 uses the result of decoding the TFCI to decode terminated information, in Step S204. Herein, the wording "terminated information" indicates a situation in which all Transmission Time Intervals related to each of the pieces of information up to the last one have been received. In the case of the preferred embodiment of FIG. 1 where the data decoding processing of Step S204 is performed, the information 1 in even-numbered frames (including the 0 (zero) frame) is decoded and the information 2 in odd-numbered frames is decoded.

Next, it is determined whether the result of the error detection by the error detection section 24 showed an error or not or whether all of the information being multiplexed has been terminated or not, in Step S205. When an error is determined to exist or all of the information being multiplexed is determined to be terminated, the TFCI candidates are initialized, in Step S206.

In addition, if Step S205 determined that there is no error or a portion of the information being multiplexed has not yet terminated, a determined TF value of the non terminated information is used as a base to limit the TFCI candidates (i.e., to limit the range of values which the TFCI may take), in Step S207, as described above.

Then, Step S206 and Step S207 are followed by Step S208, in which it is determined whether all of the data have been already received or not. If all of the data have been already received, this processing routine is finished. If all of the data have not yet been received, the process returns to Step S202 where data in the next frame is decoded.

When data in the next frame is decoded, the TFCI candidates which have been limited as described above are used in Step S203 for the decoding of the data, thereby reducing the number of the de-masking processing and the fast Hadamard transformation processing as compared with that in the standard decoding process and thus enabling the high-speed decoding, as described above.

Figure 6:
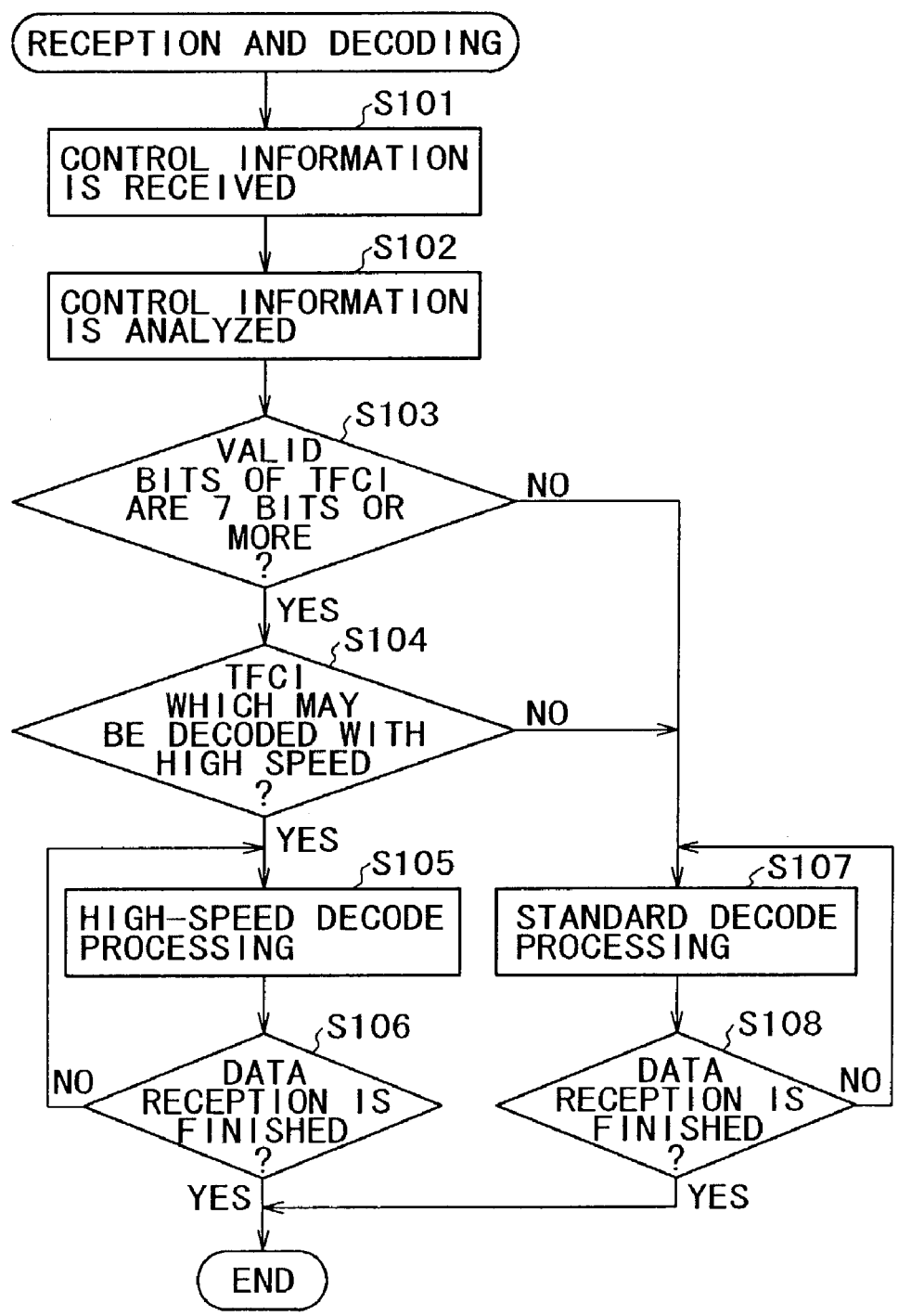
FIG. 6 is a flowchart illustrating a decoding processing of received data by the mobile information terminal shown in FIG. 4.
Figure 7:
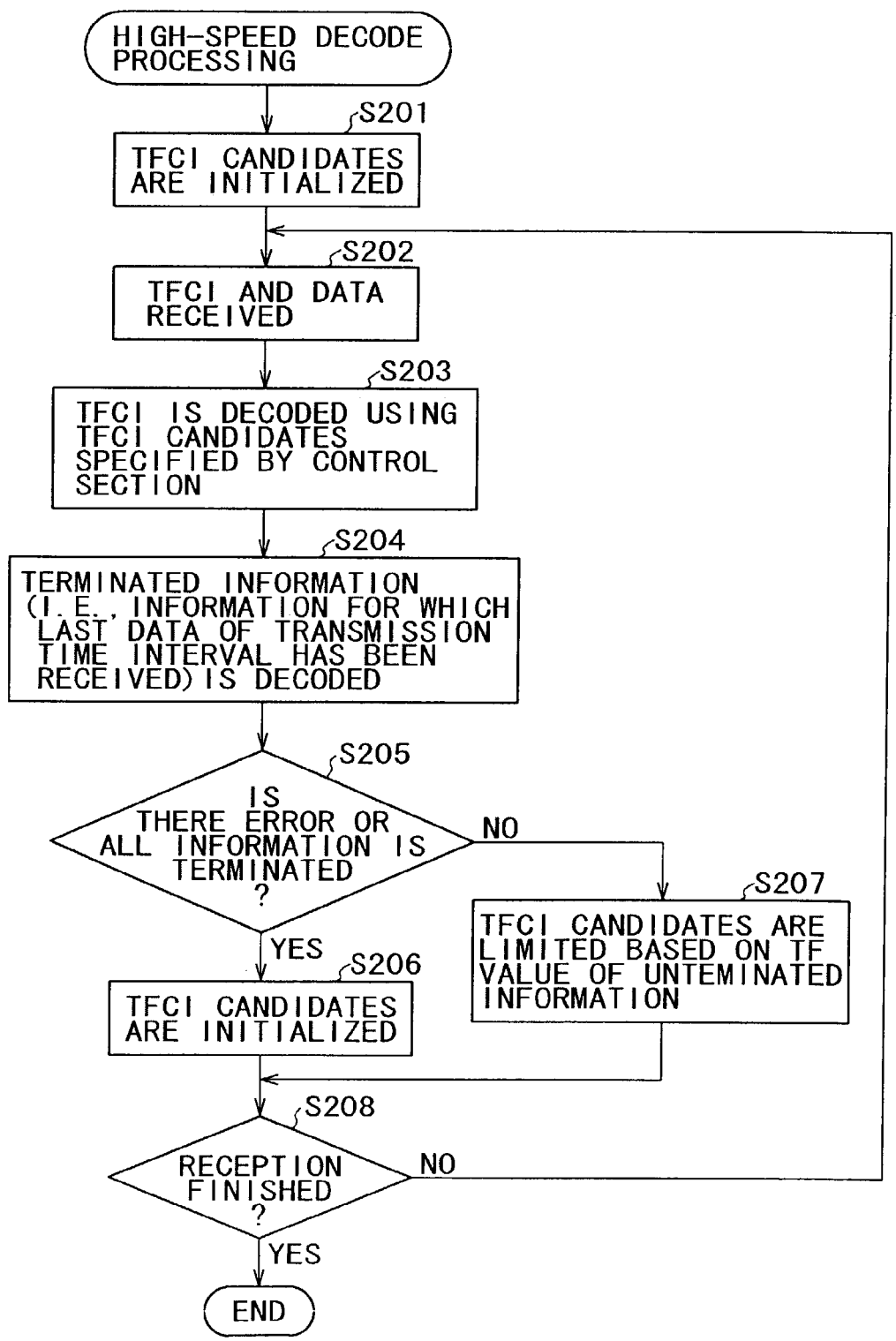
FIG. 7 is a flowchart illustrating a decoding processing of the received data, including an exemplary TFCI decoding method according to a preferred embodiment of the present invention.

It is noted that the exemplary processing shown in FIG. 6 and FIG. 7 of the preferred embodiments of the present invention intends to reduce the number of the de-masking processing and the fast Hadamard transformation processing as compared with that of the standard decoding process, thereby providing a more high-speed TFCI decoding processing. Thus, the exemplary processing shown in FIGS. 6 and 7 perform the high-speed decoding processing to the TFCI when the TFCI value is 7 bits or more.

In addition to the reduction of the number of the de-masking processing and the fast Hadamard transformation processing, the present invention also limits the TFCI candidates to reduce the number of computations in the fast Hadamard transformation processing, as described above. Thus, the present invention allows the high-speed decoding processing of the TFCI even when the TFCI value is 7 bits or less. When the high-speed decoding processing of the TFCI is performed for the TFCI having a value of 7 bits or less, Step S103 of FIG. 6 can be omitted.

In the exemplary mappings shown in FIG. 1, FIG. 2 and FIG. 3, for longer Transmission Time Intervals (TTI) a piece of information has, the number of types of TF values thereof is reduced. However, the preferred embodiments of the present invention are also applicable to a case where the longer Transmission Time Interval (TTI) a piece of information has, the number of types of TF values thereof is increased, as shown in a case shown in FIG. 8A and FIG. 8B which will be described below, for instance.

As shown in the example of preferred embodiment of FIG. 8(A), the information 1 has the TTI of 10 msec and the information 2 has the TTI of 20 msec, as with the case of FIG. 1. However, a mapping table in the case of FIG. 8(A) which shows the correspondence between TF values TF1 and TF2 of the information 1 and the information 2 and TFCI values is the one as shown in FIG. 8(B) where TF1 may take any value in the range of "0" to "3" and TF2 may take any value in the range of "0" to "63".

In this case, when the frame number of "0" corresponds to the TFCI value of "5" for instance, TF2 (TTI=20 msec) is "1". As a result, the TFCI candidates for the next frame are "4", "5", "6", and "7", thereby limiting the range of TFCI values.

Although the above description of the examples of preferred embodiments of the present invention are illustrated a determination method in a case where two pieces of information are multiplexed, various other determination methods may be considered in a case where three or more pieces of information are multiplexed and a plurality of pieces of information are terminated. The above methods include a method where even one single error leads to the initialization of the TFCI candidates, a method where errors in all of the pieces of information lead to the initialization of the TFCI candidates, a method where error-including information of 50% or more leads to the initialization of the TFCI candidates, a method where no initialization of the TFCI candidates is performed regardless of the existence of an error, or a method where the initialization of the TFCI candidates is always performed regardless of the existence of an error.

In the above-described preferred embodiments, the mobile phone terminal which is the mobile station apparatus is illustrated as the receiving side. However, the present invention is also applicable to a case where TFCI decoding is performed for the base station apparatus.

Although the present invention having been described hereinabove in its preferred form with a certain degree of particularity, other changes, variations, combinations and sub-combinations are possible therein. It is therefore to be understood that any modifications may be practiced otherwise than as specifically described herein without departing from the scope and spirit of the present invention.

What is claimed is:

1. A method of multiplexing information for mobile communications in which a plurality of pieces of information are multiplexed into a same radio frame and multiplex-transported over a radio circuit, said plurality of pieces of information having each Transmission Time Intervals selected from a plurality of types and said Transmission Time Intervals being the shortest time lengths during which data may be decoded, wherein a Transport Format Combination Indicator indicating a combination of number of data within said Transmission Time Interval of each of said plurality of pieces of information is inserted into each radio frame and transported, the method comprising:

selecting and transporting said Transport Format Combination Indicator such that a high-order bit of said transport Format Combination Indicator can be changed when there is change in the number of data within said Transmission Time Interval with respect to information having a longest Transmission Time Interval;

wherein said Transport Format Combination Indicator is encoded by using a coefficient including a mask code and is inserted into each radio frame, and when a value taken by said Transport Format Combination Indicator corresponds to a value represented by including a bit corresponding to a portion of said mask code and when the number of data within said Transmission Time Interval with respect to information having a longest Transmission Time Interval is determined, said Transport Format Combination Indicator is selected and transported such that a bit corresponding to the part of said mask code of said Transport Format Combination Indicator is determined.

2. The method of multiplexing information for mobile communications according to claim 1, wherein, prior to the transport of said plurality of pieces of information, information indicating a relation between said Transmission Time Interval of said plurality of pieces of information, said Transport Format Combination Indicator and the number of data within said Transmission Time Interval with regard to said plurality of pieces of information is transported through a control channel.

3. A method of decoding a Transport Format combination Indicator in mobile communications in which a plurality of pieces of information are multiplexed into a same radio frame and multiplex-transported over a radio circuit, said plurality of pieces of information having each Transmission Time Intervals selected from a plurality of types and said Transmission Time Intervals being the shortest time lengths during which data may be decoded, while a Transport Format Combination Indicator indicating a combination of number of data within said Transmission Time Interval of each of said plurality of pieces of information is inserted into each radio frame and transported, the method comprising:

a control information reception step for receiving control information indicating a relation between said Transmission Time Interval of each of said plurality of pieces of information, said Transport Format Combination Indicator and the number of data within said Transmission Time Interval with regard to said plurality of pieces of information, wherein said Transmission Time Interval is transmitted through a circuit that differs from the circuit used for said plurality of pieces of information;

a determination step for determining whether a high-order bit of said transport Format Combination Indicator can be changed when there is change in the number of data within said Transmission Time Interval with respect to information having a longest Transmission Time Interval, upon analyzing said control information received though said control information reception step;

a standard decoding step for performing a normal decoding method where said Transport Format Combination Indicator inserted into said radio frame is independently decoded for each of said Transmission Time Intervals of said plurality of pieces of information, when said determination step results in a negative result; and a high-speed decoding step for decoding said Transport Format Combination Indicator, upon restricting candidates for a next of said Transport Format Combination Indictor to be decoded, selected from the number of data within said Transmission Time Interval of information having the longest among Transmission Time Intervals which are determined upon a latest decoding of said Transport Format Combination Indicator, when said determination step results in a positive result.

4. The method of decoding a Transport Format Combination Indicator according to claim 3, wherein said Transport Format Combination Indicator is encoded by using a coefficient including a mask code and is inserted into each radio frame;

said determination step determines whether a high-order bit of said transport Format Combination Indicator can be changed when there is change in the number of data within said Transmission Time Interval with respect to information having a longest Transmission Time Interval;

both said standard decoding step and said high-speed decoding step include a de-masking step and a fast Hadamard transformation step; and said high-speed decoding step has less number of computations in said fast Hadamard transformation step as compared with a number of computations in said standard decoding step.

5. The method of decoding a Transport Format Combination Indicator according to claim 3, wherein said Transport Format Combination Indicator is encoded using a coefficient including a mask code and is inserted into each radio frame;

said determination step determines whether a high-order bit of said transport Format Combination Indicator can be changed when there is change in the number of data within said Transmission Time Interval with respect to information having a longest Transmission Time Interval only when said control information is analyzed and a value which said Transport Format Combination Indicator may take comprises a value represented as including a bit corresponding to a portion of said mask code;

both said standard decoding step and said high-speed decoding step include a de-masking step and a fast Hadamard transformation step; and said high-speed decoding step has less number of computations in said fast Hadamard transformation step as compared with a number of computations in said standard decoding step.

6. The method of decoding a Transport Format Combination Indicator according to claim 3, wherein said Transmission Time Interval is determined when there is no error in the data obtained as a result of data decoding of each of said piece of information, upon using the number of data within said Transmission Time Interval with regard to each piece of information acquired as a result of decoding of said Transport Format Combination Indicator as the number of data within said Transmission Time Interval regarding information having a longest of said Transmission Time Interval.

7. An apparatus for decoding a Transport Format combination Indicator in mobile communications in which a plurality of pieces of information are multiplexed into a same radio frame and multiplex-transported over a radio circuit, said plurality of pieces of information having each Transmission Time Intervals selected from a plurality of types and said Transmission Time Intervals being the shortest time lengths during which data may be decoded, while a Transport Format Combination Indicator indicating a combination of number of data within said Transmission Time Interval of each of said plurality of pieces of information is inserted into each radio frame and transported, the apparatus comprising:

a control information reception means for receiving control information indicating a relation between said Transmission Time Interval of each of said plurality of pieces of information, said Transport Format Combination Indicator and the number of data within said Transmission Time Interval with regard to said plurality of pieces of information, wherein said Transmission Time Interval is transmitted through a circuit that differs from the circuit used for said plurality of pieces of information;

a determination means for determining whether a high-order bit of said transport Format Combination Indicator can be changed when there is change in the number of data within said Transmission Time Interval with respect to information having a longest Transmission Time Interval, upon analyzing said control information received though said control information reception means;

a standard decoding means for performing a normal decoding apparatus where said Transport Format Combination Indicator inserted into said radio frame is independently decoded for each of said Transmission Time Intervals of said plurality of pieces of information, when said determination means results in a negative result; and a high-speed decoding means for decoding said Transport Format Combination Indicator, upon restricting candidates for a next of said Transport Format Combination Indictor to be decoded, selected from the number of data within said Transmission Time Interval of information having the longest among Transmission Time Intervals which are determined upon a latest decoding of said Transport Format Combination Indicator, when said determination means results in a positive result.

8. The apparatus for decoding a Transport Format Combination Indicator according to claim 7, wherein
said Transport Format Combination Indicator is encoded by using a coefficient including a mask code and is inserted into each radio frame;
said determination means determines whether a high-order bit of said transport Format Combination Indicator can be changed when there is change in the number of data within said Transmission Time Interval with respect to information having a longest Transmission Time Interval; both said standard decoding means and said high-speed decoding means include a de-masking means and a fast Hadamard transformation means; and
said high-speed decoding means has less number of computations in said fast Hadamard transformation means as compared with a number of computations in said standard decoding means.

9. The apparatus for decoding a Transport Format Combination Indicator according to claim 7, wherein
said Transport Format Combination Indicator is encoded using a coefficient including a mask code and is inserted into each radio frame;
said determination means determines whether a high-order bit of said transport Format Combination Indicator can be changed when there is change in the number of data within said Transmission Time Interval with, respect to information having a longest Transmission Time Interval only when said control information is analyzed and a value which said Transport Format Combination Indicator may take comprises a value represented as including a bit corresponding to a portion of said mask code;
both said standard decoding means and said high-speed decoding means include a de-masking means and a fast Hadamard transformation means; and
said high-speed decoding means has less number of computations in said fast Hadamard transformation means as compared with a number of computations in said standard decoding means.

10. The apparatus for decoding a Transport Format Combination Indicator according to claim 7, wherein said Transmission Time Interval is determined when there is no error in the data obtained as a result of data decoding of each of said piece of information, upon using the number of data within said Transmission Time Interval with regard to each piece of information acquired as a result of decoding of said Transport Format Combination Indicator as the number of data within said Transmission Time Interval regarding information having a longest of said Transmission Time Interval.

11. A mobile station apparatus including the apparatus for decoding the Transport Format Combination Indicator according to claim 7.

12. A mobile communications system comprising the mobile station apparatus according to claim 11.

13. A base station apparatus including the apparatus for decoding the Transport Format Combination Indicator according to claim 7.

14. A mobile communications system comprising the base station apparatus according to claim 13.

15. An apparatus for decoding a Transport Format Combination Indicator, in a mobile communications performed such that a plurality of pieces of information are multiplexed into a same radio frame to transport the multiplexed plurality of pieces of information through a radio circuit, wherein a Transport Format Combination Indicator indicating a combination of the number of data within Transmission Time Interval for each of the plurality of pieces of information is inserted into each radio frame and is transport, and wherein for the plurality of pieces of information, the Transmission Time Intervals which are the shortest time lengths during which data may be decoded are selected from a plurality of predetermined combinations of Transmission Time Interval, said apparatus comprising:

a control information reception means for receiving control information indicating a relation among said Transmission Time Interval for each of said plurality of pieces of information, said Transport Format Combination Indicator and the number of data within said Transmission Time Interval with regard to said plurality of pieces of information, wherein said Transmission Time Interval is transmitted through a circuit different from the one used for the transmission of said plurality of pieces of information;

a determination means for analyzing said control information received by said control information reception means to determine whether a change in the number of data within said Transmission Time Interval of information for which said Transmission Time Interval is longer corresponds to a change in high-order bits of said Transport Format Combination Indicator;

a standard decoding means for performing a normal decoding method where, when said determination means provides a negative determined result, said Transport Format Combination Indicator inserted into said radio frame is independently decoded for each of said Transmission Time Intervals of said plurality of pieces of information; and a high-speed decoding means where, when said determination means provides a positive determination result, the number of data within said Transmission Time Interval of information having longer Transmission Time Interval which is determined by the latest decoding of said Transport Format Combination Indicator is used as a base for limiting a candidate of said Transport Format Combination Indicator to be decoded next, thereby decoding said Transport Format Combination Indicator.

* * * * *